J. HAISH.
Wire Fences.

No. 146,671.    Patented Jan. 20, 1874.

Witnesses:
G. Mathys.
Solon C. Kemon

Inventor:
Jacob Haish
Per
Attorneys.

UNITED STATES PATENT OFFICE.

JACOB HAISH, OF DE KALB, ILLINOIS.

IMPROVEMENT IN WIRE FENCES.

Specification forming part of Letters Patent No. 146,671, dated January 20, 1874; application filed December 22, 1873.

*To all whom it may concern:*

Be it known that I, JACOB HAISH, of the city and county of De Kalb and State of Illinois, have invented a new and Improved Farm-Fence; and I do hereby declare that the following is a full, clear, and exact description of the same, reference being had to the accompanying drawing forming a part of this specification.

The invention relates to means whereby the twisted strands composing the wire-fence panel may be made not only much stronger, but whereby it will be enabled to turn stock, and allow for expansion and contraction by heat and cold. It consists in making the strands of several pieces of wire, each fastened at one end to the post or another piece of wire, and then carried out and hooked by a bent end with a corresponding one from the opposite direction, spikes being thrown out on each side of the fence at the point of junction. With two wires to each strand, spikes will thus be thrown out on each rail, preferably at intervals of about a foot, more or less.

Figure 1:
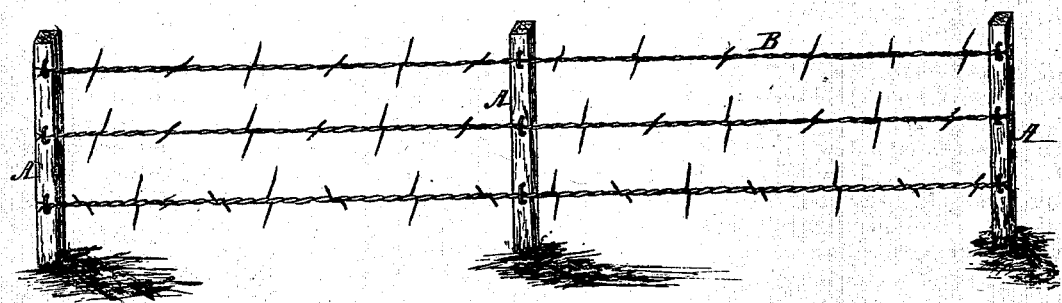
Figure 2:

Figure 1 is a side elevation, and Fig. 2 a plan view, illustrative of my invention.

A represents the posts which hold the wires, and which may be placed at any desired distance apart, and B the wire strands. The wire strands consist each of pairs of wires $a\ a'$ and $b\ b'$, the pieces of wires being all of the same length, while each strand, formed of two or more conjoined wires, is spirally wrapped about another, which winds in an opposite direction. At the point of junction the ends are turned out horizontally, one on each side of the fence, so as, by their sharpened spikes $c$, to deter the animals from pressing with their weight against the fence, and thereby impairing or breaking it. This coupling of spirally-wound wires gives also an oppportunity for free expansion and contraction, while the result of this, in other constructions, is commonly to snap the wires asunder.

Two or more more strands may be employed in each panel, and may be placed at a greater or less distance from each other, according to the kind of stock against which the farmer is fencing.

Having thus described my invention, what I claim as new, and desire to secure by Letters Patent, is—

A fence made of spirally-wrapped wires $a\ a'$ and $b\ b'$, the ends of each two conjoined wires being hooked together to form projecting spikes $c\ c$, as and for the purpose specified.

JACOB HAISH.

Witnesses:
 SOLON C. KEMON,
 CHAS. A. PETTIT.